United States Patent
Runft et al.

(10) Patent No.: US 10,913,556 B2
(45) Date of Patent: Feb. 9, 2021

(54) DEVICE FOR METERING FILLING MATERIAL

(71) Applicant: Robert Bosch GmbH, Stuttgart (DE)

(72) Inventors: Werner Runft, Winnenden (DE); Jens Schlipf, Freiberg (DE); Walter Boehringer, Remshalden (DE); Wolfgang Wick, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/493,117

(22) PCT Filed: Jan. 24, 2018

(86) PCT No.: PCT/EP2018/051678
§ 371 (c)(1),
(2) Date: Sep. 11, 2019

(87) PCT Pub. No.: WO2018/166682
PCT Pub. Date: Sep. 29, 2018

(65) Prior Publication Data
US 2020/0115072 A1    Apr. 16, 2020

(30) Foreign Application Priority Data
Mar. 13, 2017 (DE) .................. 10 2017 204 083

(51) Int. Cl.
*B65B 1/16* (2006.01)
*A61J 3/07* (2006.01)
(Continued)

(52) U.S. Cl.
CPC .............. *B65B 1/16* (2013.01); *A61J 3/074* (2013.01); *B65B 1/10* (2013.01); *B65B 1/366* (2013.01); *G01F 11/24* (2013.01)

(58) Field of Classification Search
CPC .. B65B 1/16; B65B 1/10; B65B 1/366; B65B 1/36; B65B 1/363; A61J 3/074; G01F 11/24
(Continued)

(56) References Cited

U.S. PATENT DOCUMENTS 4,709,837 A    12/1987 Erdman
2005/0023297 A1    2/2005 Zill et al.
(Continued)

FOREIGN PATENT DOCUMENTS

DE    202007014478    12/2007
DE    102011085283    8/2012
ER    2428450    3/2012

OTHER PUBLICATIONS

International Search Report for Application No. PCT/EP2018/051678 dated Apr. 4, 2018 (English Translation, 3 pages).

*Primary Examiner* — Timothy P. Kelly
*Assistant Examiner* — Christopher M Afful
(74) *Attorney, Agent, or Firm* — Michael Best & Friedrich LLP (57) ABSTRACT

The invention relates to a device for filling containers with filling material in powder form, comprising: at least one metering wheel (29); a metering chamber (28a, 28b); at least one container (27) for discharging into the metering chamber (28a, 28b) a filling material (21) to be metered; at least one filter (36) which is mounted on the metering chamber (28a, 28b), the filter (36) being non-permeable to the filling material (21) and permeable to a gaseous medium; at least one feed (46) for the gaseous medium, to influence the filling material (21) to be metered in the metering chamber (28a, 28b) by means of the gaseous medium via the filter (36), at least one transport means (43) being provided to displace the
(Continued)

filter (36) such that a new region of the filter (36) reaches the underside of the metering chamber (28*a*, 28*b*).

13 Claims, 5 Drawing Sheets

(51) Int. Cl.
  *B65B 1/10* (2006.01)
  *B65B 1/36* (2006.01)
  *G01F 11/24* (2006.01)
(58) Field of Classification Search
  USPC .......................................................... 141/67
  See application file for complete search history.

(56) References Cited

U.S. PATENT DOCUMENTS

| | | | |
|---|---|---|---|
| 2011/0253511 A1 | 10/2011 | Jackels | |
| 2013/0255833 A1* | 10/2013 | Runft ...................... | A61J 3/074 |
| | | | 141/145 |
| 2013/0327791 A1* | 12/2013 | Runft ........................ | B65B 1/36 |
| | | | 222/218 |

\* cited by examiner

DEVICE FOR METERING FILLING MATERIAL

BACKGROUND OF THE INVENTION

The present invention relates to a device for filling, in particular, filling material in powder form.

A device of the generic type is known from DE 102011085283 A1. In that case, a plurality of metering chambers of a metering wheel are formed over a common component. Arranged between sleeve attachments and openings is a filter, which can be replaced if necessary, if the filter becomes blocked by filling material and can no longer be adequately cleaned. This normally requires the filling unit to be disassembled and reassembled, which involves a certain amount of effort.

It is an object of the invention is to bring the filter back into a functional state without much effort and loss of time.

SUMMARY OF THE INVENTION

In contrast, the device according to the invention has the advantage that the filter can be brought rapidly back into a proper state, without the filter unit being taken apart. This is achieved according to the invention in that at least one transport means is provided, which moves the filter relative to the metering chamber, such that a further, functional region of the filter reaches the underside of the metering chamber. As a result of the filter being moved further, for example filter regions that are closed by powder are replaced by fresh, unused filter regions. This may be effected, for example, by moving or further rotating a shaft from the outside, without the necessity of disassembling the filling wheel.

In an expedient development, it is provided that the filter is designed to be displaceable in a radial and/or axial direction with respect to an axis of rotation of the metering wheel. As a result, new functional filter regions can be selectively brought under the metering chambers.

In an expedient development, a tensioning means for the filter is provided. As a result, the filter tensions equally at each metering chamber, such that there is no formation of folds that could impede the metering operation.

In an expedient development, at least one roller, preferably a wind-off roller and/or a wind-on roller, is provided as transport means. In this case a plurality of filter layers may be wound-on at the beginning of the process, such that there are sufficient new functional filter regions available, even after a multiplicity of metering operations. Particularly preferably, the filter is connected to the rollers, such that a corresponding filter movement can be achieved by actuation of the rollers.

In an expedient development, the feeder is designed to be movable. In normal operation, the feeder presses the filter against the underside of the metering chamber. When the filter is being displaced, on the other hand, the feeder does not exert any pressure, in order to enable the filter to be moved. Since the filter is flush with the underside of the metering chamber, precise filling operations are made possible.

In an expedient development, a toothing is provided between the two rollers. Synchronous operation of the two rollers is thereby rendered possible. Moreover, there is no need for an additional locking device for the rollers, since only one roller must be fixed in order to prevent the further transport of the filter.

In an expedient development, the tensioning means is connected to the metering wheel in a freely movable manner, preferably via a cardanic suspension. Particularly preferably, the tensioning means comprises at least one spring. Any mounting errors or inhomogeneities of the filter can thereby be compensated.

In an expedient development, the filter is realized in the form of a band, in particular comprising a plurality of filter bands. A plurality of, and therefore narrower, bands, have the advantage that the uniformity of the filter tension is not so greatly affected by inhomogeneities in the filter, mounting errors or production inaccuracies.

Further expedient developments are disclosed by further dependent claims and the description.

BRIEF DESCRIPTION OF THE DRAWINGS

Exemplary embodiments of the device according to the invention are represented in the drawing, and described in greater detail in the following.

In the drawings.

DETAILED DESCRIPTION

Figure 1:
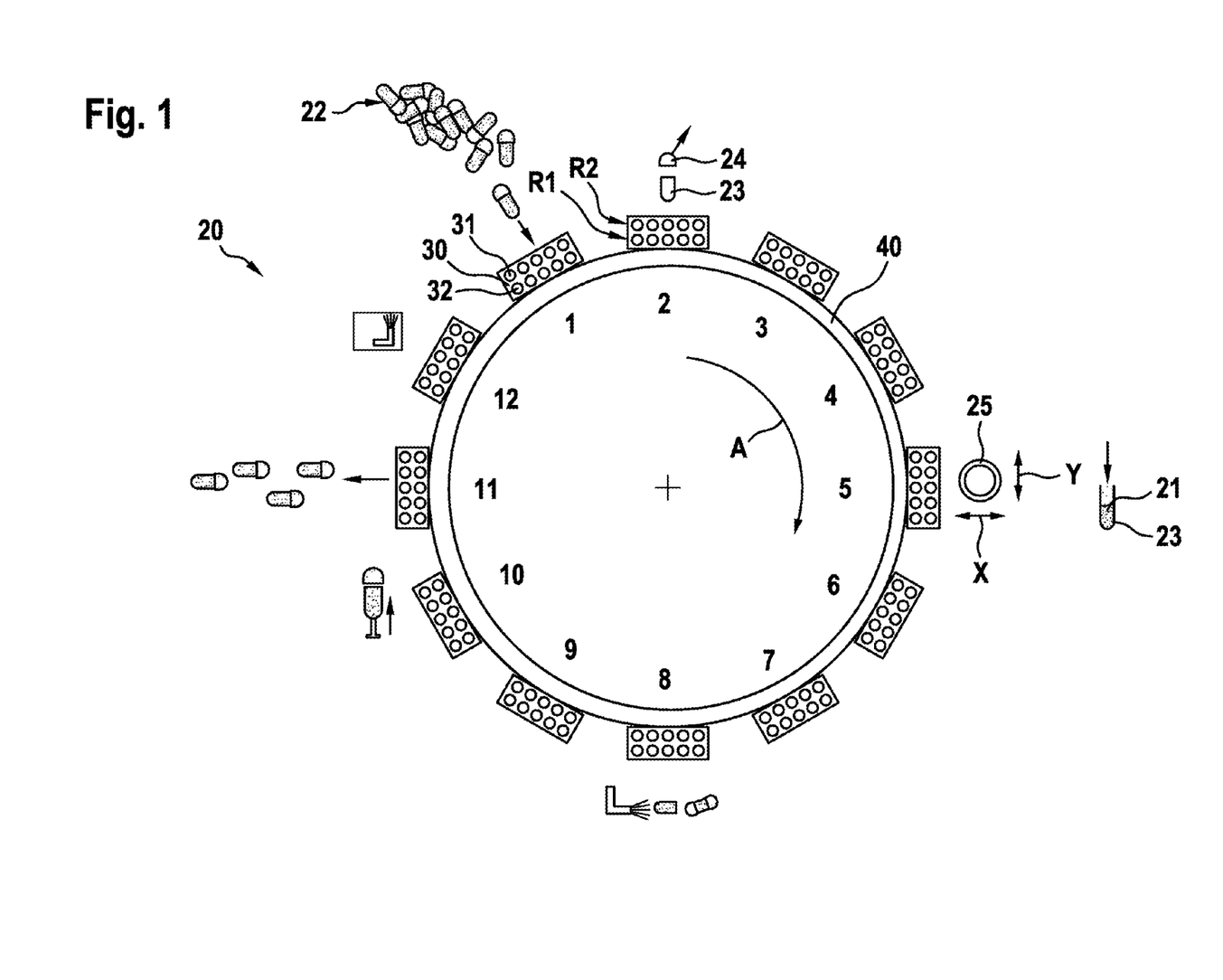
FIG. 1 shows a schematic top view of a device for filling filling material.

FIG. 1 shows an overall view of the device 20, which comprises a station wheel 40 having a total of twelve stations 1 to 12. Arranged in the station wheel 40, along the circumference, are a total of twelve capsule holders 30, each capsule holder 30 having a multiplicity of receivers 31, 32 for receiving capsules 22. The receivers 31, 32 in this case are arranged in two rows, namely a first row R1 and a second row R2, parallel to each other in each capsule holder 30. A direction of rotation of the station wheel 40 is identified by the arrow A.

In this case, the stations of the station wheel 40 are as follows. At station 1, empty, closed capsules, which comprise a capsule lower part 23 and a capsule upper part 24, are supplied from a stock. The capsules in this case are each inserted singly into a receiver 31 of the capsule holder 30.

At station 2, the capsules 22 are opened, i.e. the capsule upper part 24 is removed from the capsule lower part 23, such that the capsule lower part 23 remains in the receiver 31.

It is to be noted that the supplying and opening of the capsules may also be effected at the same station. Also, for example, the first row may be filled with capsules at station 1, and the second row at station 2, and preferably also opened identically at the stations.

In this exemplary embodiment, stations 3 and 4 are unoccupied.

Station 5 is a filling station, in which the opened capsules 22 are filled. Provided for this purpose is a filling device 25, which is shown in detail in the further figures. The filling device 25 according to FIG. 2 comprises a metering wheel 29 and a storage container 27, in which the filling material 21, in powder form, is arranged. The filling device 25 could comprise, for example, a movement device, not visible here, that moves the filling device 25 in two directions, namely a first direction X and a second direction Y.

Figure 2:
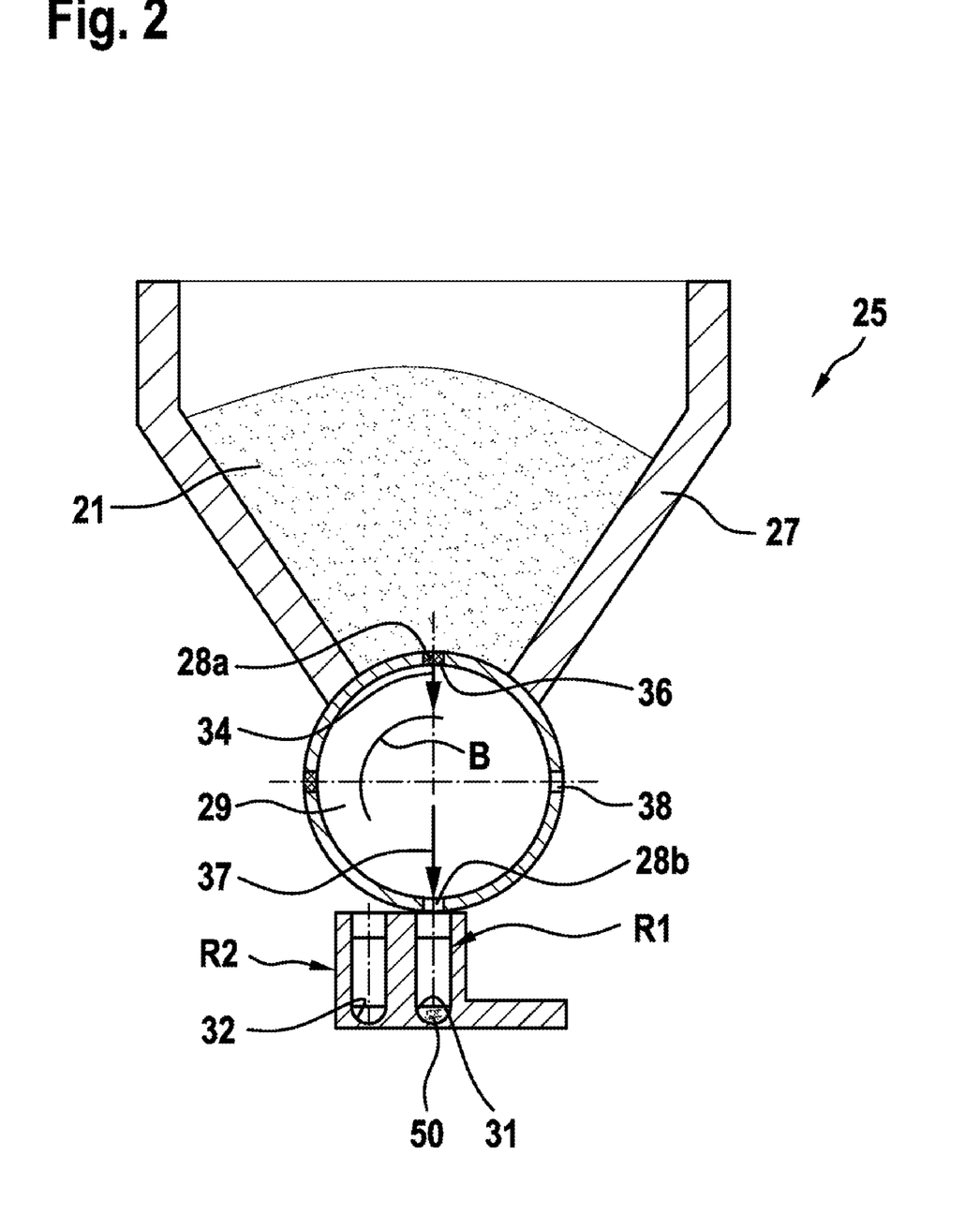
FIG. 2 shows a schematic sectional view through a filling device.

FIG. 2 in this case shows a start position of the filling operation, the filling device 25 being arranged over a receiver 31 of the first row R1 of receivers, and thus positioned in a first filling position. The metering wheel 29 has a first metering chamber 28*a* and a second metering chamber 28*b*. In the position represented in FIG. 2, at a first receiving position a small filling quantity is sucked out of the storage container 27, into the first metering chamber 28*a*, by means of vacuum. The metering wheel 29 then rotates by 180° in the direction of the arrow B, and at a delivery positions delivers the small filling quantity by means of compressed air, such that the filling quantity falls into the capsule lower part 23. If necessary, the filling device 25 then executes a movement, such that the delivery position is thus positioned, in a second filling position, over a receiver 32 of the second row R2. A second filling quantity is then in the same manner filled into the capsule lower part 23 in the receiver 32 of the second row R2. Particularly preferably, the metering wheel 29 may also have four metering chambers, arranged at an angle of 90° in relation to each other, the metering wheel 29 in this case being rotated forward by 90° in each case for the purpose of receiving and delivering the filling material 21. It is to be noted that the filling device may also alternatively comprise a plurality of filling units in series, the number of filling units being equal to the number of receivers 31, 32 in the row R1 and R2, or a multiple or a fraction thereof. Additionally shown in FIG. 2 is a cleaning position 38, which is offset by 90° from the filling position of the capsule 22 along the direction of rotation B.

If necessary, a further filling device may also be provided at station 6, such that, for example, the first filling device performs a partial filling at station 5, and the second filling device 6 performs a final end filling and precise metering of the filling quantity.

A weighing device, for example, may be provided at station 7, in order to check the filled capsules.

Station 8 is an ejection station, at which damaged or unfilled or incorrectly filled capsules can be separated out.

At station 9, the capsule upper parts 24 are positioned back over the now filled capsule under parts 23, and the capsules are closed again in station 10. This may be effected, for example, by lowering the capsule upper parts onto the capsule lower parts.

Station 11 is the delivery station for the filled capsules, and station 12 is a cleaning station, in which the capsule holders 30 are cleaned, in order to avoid the capsules being mis-filled or incorrectly received in the receivers 31.

Figure 3:
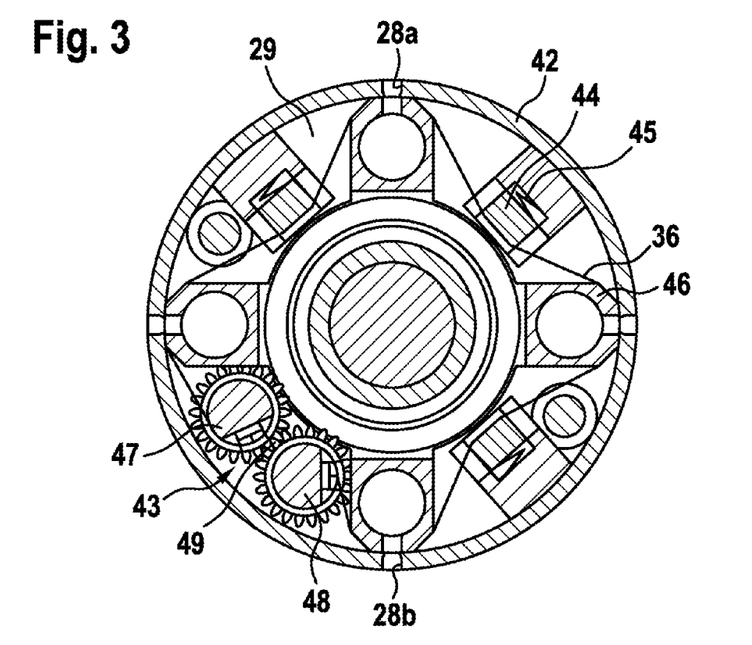
FIG. 3 shows a sectional view through a metering wheel in a first position during the filling operation.

FIG. 3, in the section through the metering wheel 29, shows its structure in greater detail. The outer case of the metering wheel 29 is formed by a metering case 42. This metering case 42 is breached by a plurality of metering chambers 28*a*, 28*b*. In the exemplary embodiment, the metering chambers 28*a*, 28*b* are each arranged with an offset of 90°. Provided under each metering chamber 28*a*, 28*b* there is a respective feeder 46 for a gaseous medium such as, for example, air. This feeder 46 has a relatively large round cross section, which extends in the axial direction with respect to the axis of rotation of the metering wheel 29. Branching off outwardly in the radial direction from the feeder 46 in each case are channels to the metering chambers 28*a*, 28*b*, outward in the radial direction. The cross section of the respective channel corresponds to that of the metering chamber 28*a*, 28*b*. Between the channel, or the feeder 46, and the underside of the metering chamber 28*a*, 28*b* there is a filter 36. The filter 36 in this case is realized such that, on the one hand, it holds back there filling material 21 present in the metering chamber 28*a*, 28*b*. On the other hand, the filter 36 is permeable to the gaseous medium, which can pass through the feeder to the respective metering chambers 28*a*, 28*b*.

If the filling material 21 is being metered out of the storage container 27 and into the corresponding metering chamber 28*a*, 28*b*, a negative pressure, or vacuum, is generated in the feeder 46, such that the filling material 21 is sucked into the metering chamber 28*a*, 28*b*. The filling material 21 is then scraped off, at the outer periphery of the storage container 27, by corresponding rotation of the metering wheel 29. The metering wheel 29 is moved further into the emptying position. In the emptying position, as represented, for example, at the bottom in FIG. 2, a pulse of compressed air is generated to empty the metered filling material 21 into the capsules 22. For this purpose, an over-pressure is accordingly applied to the feeder 46.

The feeder 46 is realized so as to be radially movable relative to the metering chamber 28*a*, 28*b*. In the position according to FIG. 3, the usual working position during the filling operation, the feeder 46 presses the filter 36 against the underside of the metering chamber 28*a*, 28*b*. This may be effected, for example, by means of spring force and serves to effect sealing between the feeder 46, filter 36 and metering chamber 28*a*, 28*b*. In the exemplary embodiment, the filter 36 is also connected to those filter regions that are located beneath a further metering chamber 28*a*, 28*b* that, for example, is offset radially by 90°. Preferably, all filter regions under all metering chambers 28*a*, 28*b* of the metering wheel 28 are interconnected. The filter 36, and thus all filter regions beneath the metering chambers 28*a*, 28*b*, are realized so as to be movable. In the exemplary embodiment according to FIGS. 3 and 4, the filter 36 can be moved further, about the axis of rotation of the metering wheel 29, along the circumference. A transport means 43 is provided for this purpose. In the exemplary embodiment, the transport means 43 comprises two rollers 47, 48. These rollers are interconnected by means of a toothing 49. The roller 47 serves as a wind-off roller. Wound on there are fresh, not yet used regions, or such regions that have not yet been positioned beneath the metering chambers 28*a*, 28*b*. Along the entire inner circumference of the metering case 42, the other end of the filter 36 is connected to the roller 48, which acts as a wind-on roller. The roller 48 winds on used filter regions, i.e. such regions that have already been positioned on the underside of the metering chamber 28*a*, 28*b* and that, for example owing to powder caking, are no longer permeable to gas and therefore can no longer be used for a proper filling operation.

Figure 4:
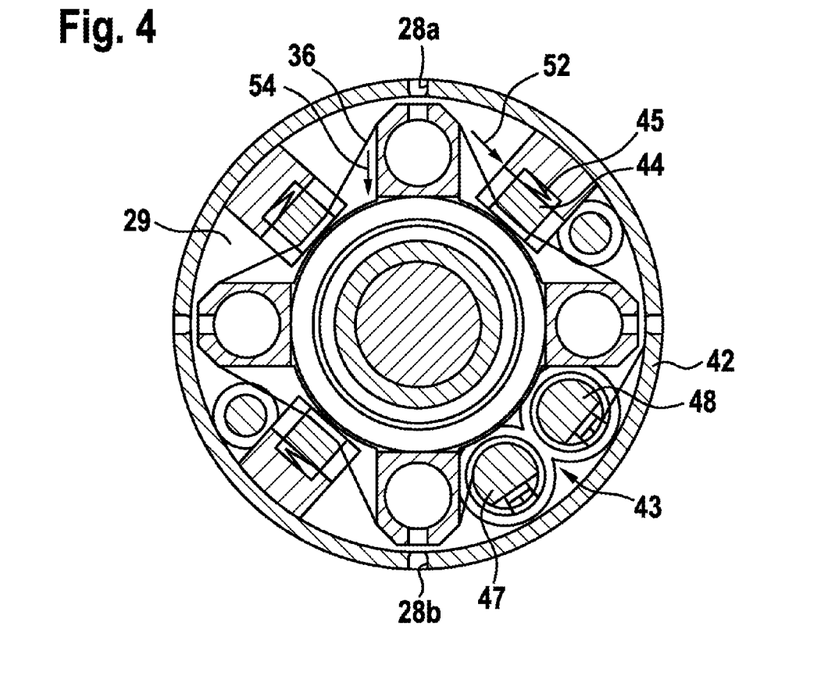
FIG. 4 shows a sectional view through the metering wheel from FIG. 3 in a second position, in which the filter is transported further.

In order for the filter 36 to be arranged without folds and in a flush manner beneath the metering chambers 28*a*, 28*b*, the filter 36 must be tensioned. Corresponding tensioning means 44 are provided for this purpose. These are arranged, for example, on the inner side of the metering case 42. The surfaces projecting radially in relation to the mid-point of the metering wheel 29 come into contact with the filter 36 such that the filter 36 is thereby tensioned. Provided for this purpose, in particular, is a suspension 45, by which this outer part of the tensioning means 44 is connected in a freely movable manner to the metering case 42. Preferably, this is a cardanic suspension 45. In order to generate a sufficient tension on the filter 36, corresponding springing elements (springs, air cushions, etc.), for example, are provided as part of the suspension 45, as represented in FIGS. 3, 4. In particular, any mounting errors or inhomogeneities of the filter 36 can easily be compensated. The tensioning means 44 are preferably arranged between two adjacent feeders 46 in each case. The tensioning means 44 preferably extend over the entire width of the filter 36, which is based on the width of the metering wheel 29 having a multiplicity of metering chambers 28a, 28b arranged next to each other, as shown in greater detail in FIG. 6.

FIG. 4 shows the transport position of the filter 36. For this purpose, the feeders 46 have been removed from the metering case 42 in the radial direction 54. As a result, the filter 36 is no longer clamped to the inner side of the metering case 42, and becomes freely movable in a movement direction 52. The filter 36 is moved further by corresponding control of the transport means 43, for example consisting of the rollers 47, 48. Already used regions of the filter 36 are wound onto the roller 48. Correspondingly, new regions of the filter 36 are wound off from the roller 47. Owing to the toothing 49, the movement of the two rollers 47, 48 can be synchronized.

Figure 5:
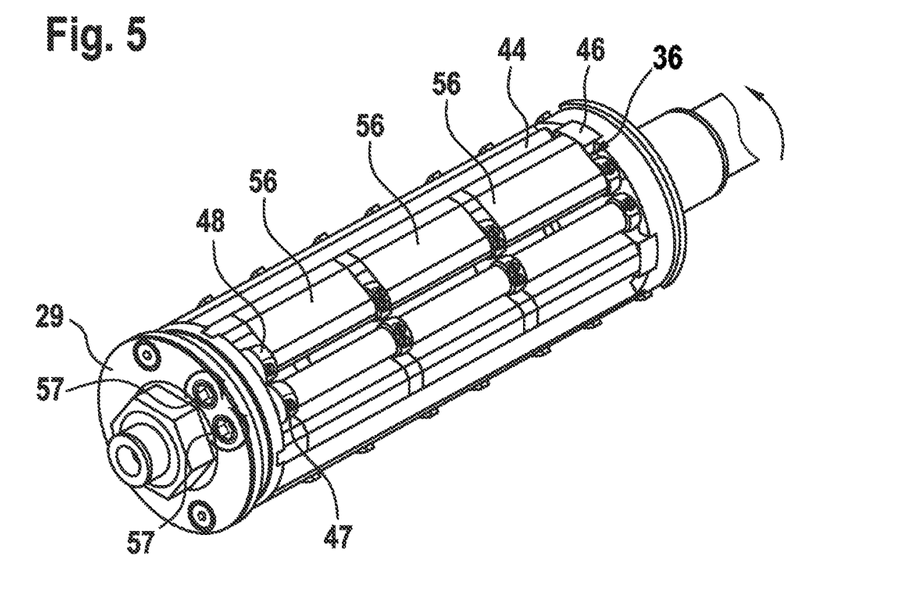
FIG. 5 shows a perspective view of the metering wheel, without metering case.

The representation according to FIG. 5 shows the metering wheel 29 without the metering case 42. Substantially, the filter 36 extends completely over the entire width of the metering wheel 29. Shown exemplarily are three mutually parallel filter runs 56, which extend in the circumferential direction. What is essential here is that the filter runs 56 are realized such that they cover all regions of the metering chambers 28a, 28b. The rollers 47, 48 likewise extend over the entire width of the metering wheel 29, from one end face to the other. Provided at one end face is at least one leadthrough for driving the transport means 43, for example for driving at least one of the rollers 47, 48. In the exemplary embodiment, two leadthroughs 57 are provided for each of the rollers 47, 48. The movement of the rollers 47, 48 is effected counter-directionally, as indicated by the arrows. Both the start and the end of the filter runs 56 are connected to the rollers 47, 48, such that winding-on of the used filter regions and winding-off of the unused filter regions can be effected. A plurality of, and therefore narrower, filter runs 56 have the advantage that the uniformity of the filter tension is not so greatly affected by inhomogeneities in the filter 36, mounting errors or production inaccuracies. In principle, however, it would be possible for only a single filter run to be provided 56. Also possible in principle are two or more filter runs 56. The tensioning means 44 are to be arranged a suitable manner, such that the desired tensioning of all filter runs 56 is reliably achieved in the regions of the metering chambers 28a, 28b.

Figure 6:
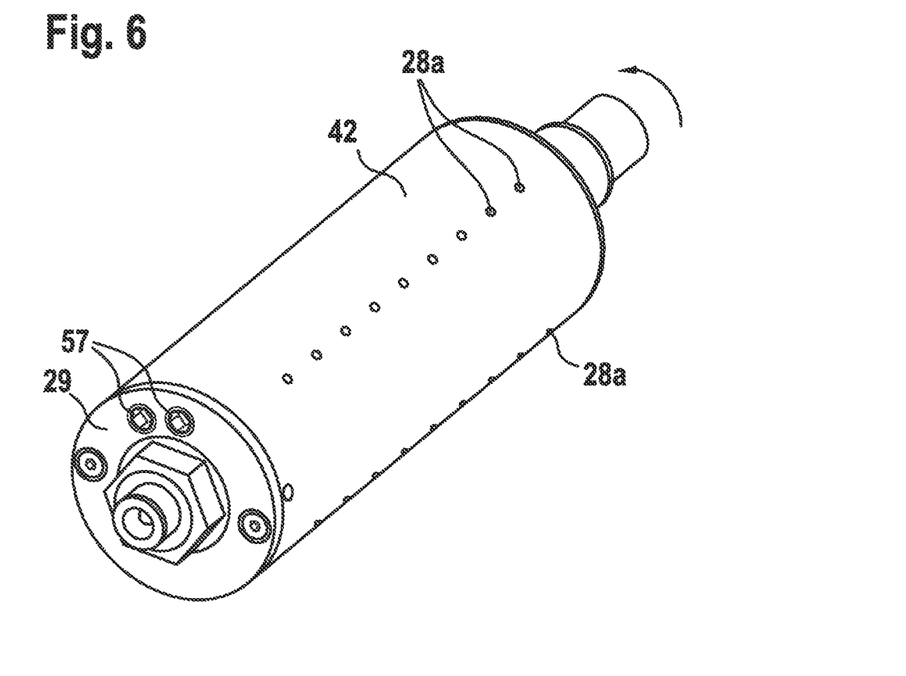
FIG. 6 shows a perspective view of the metering wheel according to FIG. 5, with metering case.

It can be seen from FIG. 6 how, in the case of the exemplary embodiment according to FIG. 5, the various filter runs 56 and other components are surrounded by the metering case 42. A multiplicity of metering chambers 28a, 28b are arranged on a line along the longitudinal direction of the metering wheel 29, such that a plurality of capsules 22 can be filled simultaneously, preferably corresponding to the number of receivers 31, 32 in the capsule holder 30.

Figure 7:
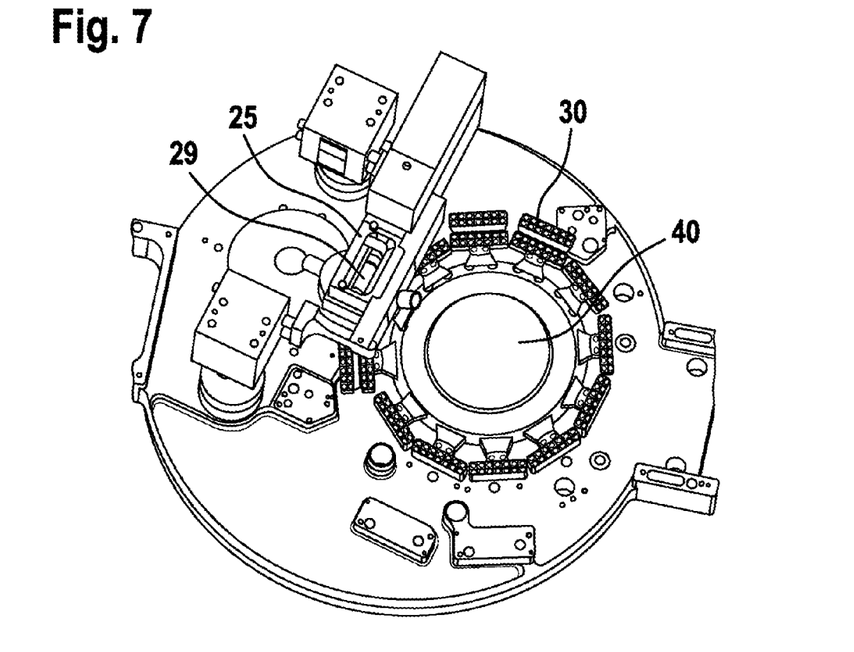
FIG. 7 shows a perspective view, from above, of the device for filling filling material according to FIG. 1.

FIG. 7 shows how the filling device 25, with the metering wheel 29, is integrated in the device 20 for filling. Substantially, the axis of rotation of the metering wheel 29 is arranged tangentially in relation to the station wheel 40, i.e. parallel to the longitudinal axis of the capsule holder 30 arranged thereon.

Figure 8:
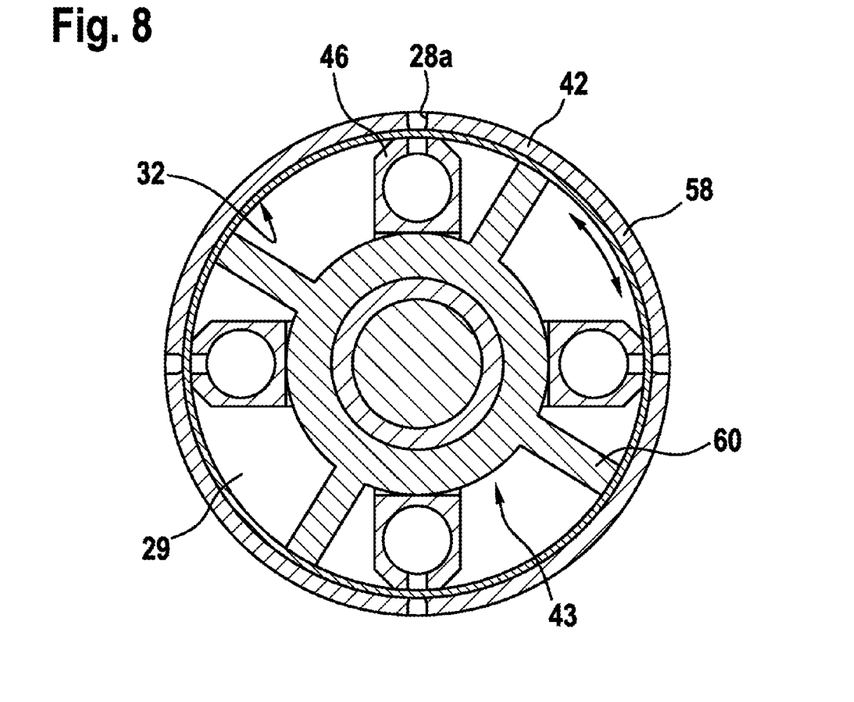
FIG. 8 shows a schematic sectional view through the metering wheel of a further exemplary embodiment.

In the case of the alternative exemplary embodiment according to FIG. 8, the metering wheel 29 comprises a transport means 43, which is realized as a transport cross 50. The transport means 43 is connected to the filter 36. In this exemplary embodiment, the filter 36 is embodied as a filter ring 58. The outer side of the filter ring 58 is in alignment with the inner side of the metering case 42. The inner side of the filter ring 58 is connected to arms of the transport cross 60. The transport means 43 is able to move the filter 36 relative to the metering chamber 28a, 28b. The transport cross 60 is mounted centrally. By way of example, a movement of the filter 36 is effected in the direction of rotation of the metering wheel 29. The filter 36 could be of a stiff design, for example.

For example, the filter 36 could be composed of a sintered material, or of wire fabric. However, textile filters would also be conceivable. Particularly preferably, the filter is a thin woven filter 36. The filter 36 could be realized as a single piece. Alternatively, the filter 36 could also be composed of a plurality of individual parts, for example a plurality of filter runs 56. The filter runs 56 could each be connected to at least one of the rollers 47, 48, or to both rollers 47, 48.

In the exemplary embodiments, the filter 36 can be moved, for example, in the radial direction or in the circumferential direction with respect to the direction of rotation of the metering wheel 29. Alternatively, however, it would be conceivable to move the filter 36, for example, in another direction such as, for example, along the longitudinal axis of the metering wheel 29. What is essential is that the transport means 43 is designed to displace the filter 36 such that new regions of the filter 36 that are permeable to gas are arranged beneath the metering chamber 28a, 28b.

The general idea can also be used with other filling principles, in which, for example, not a metering wheel but, for example, a metering disk, is used. For example, a metering wheel 29 or a metering disk, or other forms suitable for making metering chambers 28a, 28b available, could thus be used as metering means.

The device for filling, in particular, filling material in powder form is preferably used in packaging technology for filling and packaging pharmaceuticals in capsules 22. However, other bulk materials such as pellets or the like could also equally be filled. However, the use is not limited to this.

The invention claimed is:

1. A device for filling a receptacle with filling material, the device comprising at least one metering wheel (29), at least one metering chamber (28a, 28b), at least one container (27) for delivering the filling material (21) to be metered into the metering chamber (28a, 28b), at least one filter (36), which is arranged on the metering chamber (28a, 28b), wherein the filter (36) is configured to be non-permeable to the filling material (21) and to be permeable for a gaseous medium, at least one feeder (46) for the gaseous medium, in order to act, by means of the gaseous medium, via the filter (36), upon the filling material (21) to be metered into the metering chamber (28a, 28b), the device further comprising at least one transport means (43) for displacing the filter (36) such that a further region of the filter (36) reaches an underside of the metering chamber (28a, 28b).

2. The device as claimed in claim 1, characterized in that the filter (36) is displaceable in a radial and/or axial direction with respect to an axis of rotation of the metering wheel (29).

3. The device as claimed in claim 1 and further comprising at least one tensioning means (44) for tensioning the filter (36).

4. The device as claimed in claim 1, characterized in that the transport means (43) comprises at least one roller (47, 48).

5. The device as claimed in claim 4, characterized in that the filter (36) is connected to the at least one roller (47, 48).

6. The device as claimed in claim 1, characterized in that the feeder (46) is configured to be movable, in order to press the filter (36) against the metering chamber (28a, 28b), and to not exert any pressure against the filter (36) when the filter (36) is being displaced by the transport means (43).

7. The device as claimed in claim 4, characterized in that the at least one roller includes two rollers, and wherein at least one toothing (49) is provided between the two rollers (47, 48).

8. The device as claimed in claim 3, characterized in that the tensioning means (44) is connected in a freely movable manner to the metering wheel (29).

9. The device as claimed in claim 3, characterized in that the tensioning means (44) is provided with at least springing element (45).

10. The device as claimed in claim 1, characterized in that the filter (36) is configured at least in the form of a band.

11. The device as claimed in claim 1, characterized in that the transport means (43) comprises a wind-off roller (47) and/or a wind-on roller (48).

12. The device as claimed in claim 3, characterized in that the tensioning means (44) is connected in a freely movable manner to the metering wheel (29) via a cardanic suspension.

13. The device as claimed in claim 1, characterized in that the filter (36) comprises a plurality of filter runs (56).

* * * * *